Dec. 23, 1969     R. P. TAYLOR     3,485,151
HELICOPTER CAMERA MOUNTING
Filed Sept. 14, 1967
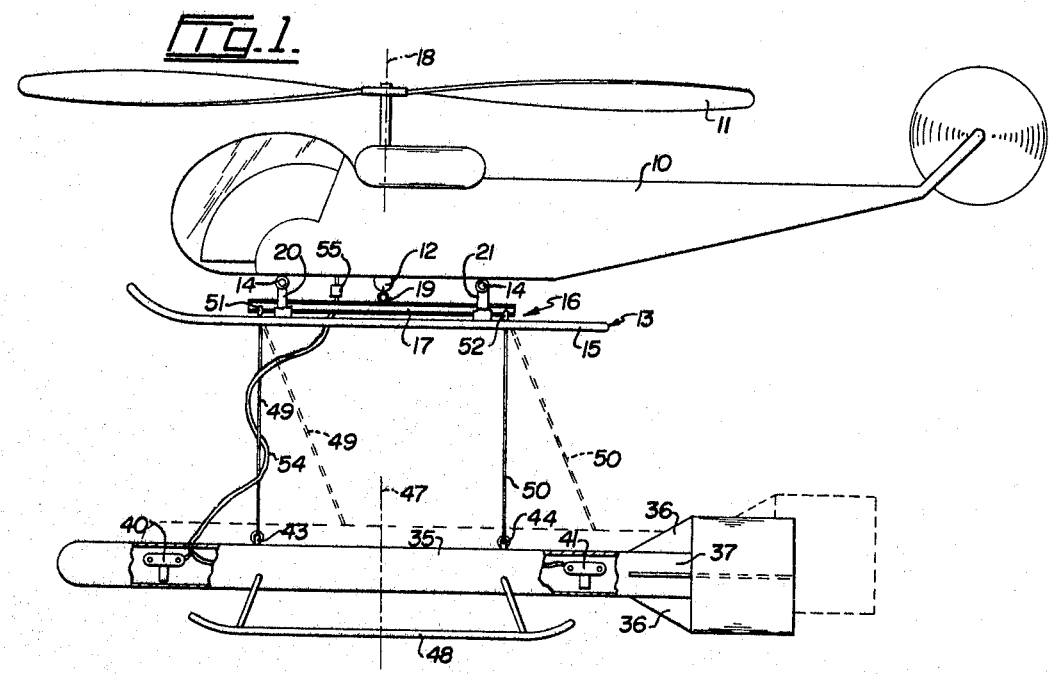
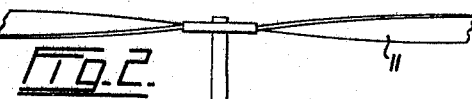
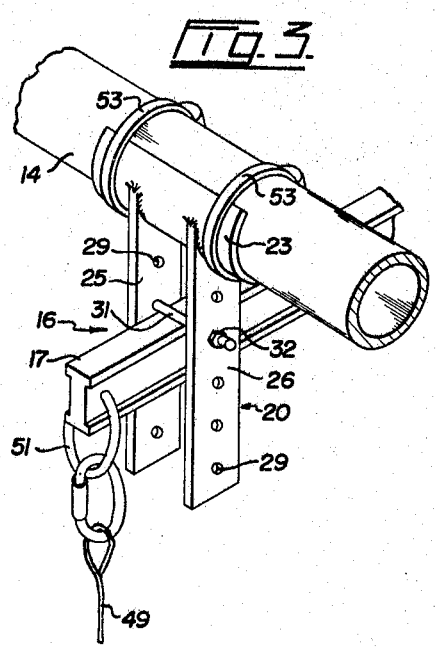
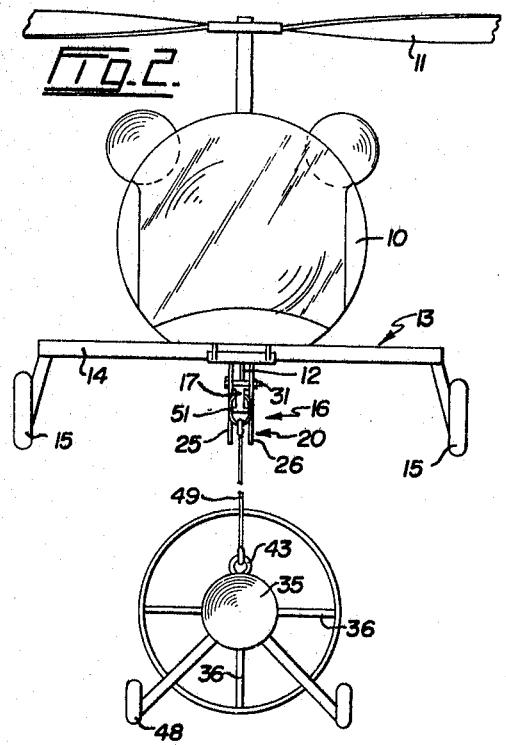
INVENTOR
ROBERT P. TAYLOR
BY
*Fetherstonhaugh & Co.*
ATTORNEYS

United States Patent Office 3,485,151
Patented Dec. 23, 1969

3,485,151
HELICOPTER CAMERA MOUNTING
Robert P. Taylor, Victoria, British Columbia, Canada, assignor to Vancouver Island Helicopter Ltd., Sidney, British Columbia, Canada
Filed Sept. 14, 1967, Ser. No. 667,759
Int. Cl. G03b 29/00, 17/56
U.S. Cl. 95—12.5                                                 4 Claims

ABSTRACT OF THE DISCLOSURE

Camera mountings for helicopters having a stabilizing beam swingably suspended at its middle length from the cargo hook of the helicopter, and an elongated streamlined camera housing suspended below and in parallelism with the beam. The stabilizing beam and with it the camera housing are maintained in fore and aft parallelism with, and at a predetermined angular relationship to, the helicopter by means of restraining elements positioned fore and aft of the cargo hook and engageable with the beam.

BACKGROUND OF THE INVENTION

This invention relates to aircraft camera mounting assemblies particularly mounting assemblies to permit stereophotographic surveys to be conducted from helicopters.

In aerial stereophotographic survey work, the aircraft used for this purpose must be specially fitted with semi-permanent camera mountings whereby the cameras may be located and maintained in the same horizontal plane and in axial parallelism. These mountings are not so constructed as to be readily detachable from the aircraft. Furthermore, as each individual aircraft has its individual structural characteristics, one type of mounting will not fit all aircraft. Consequently, it is the usual practice that an aircraft allocated for this type of work is rarely ever used for any other type of work.

SUMMARY OF THE INVENTION

The present invention provides a camera mounting or suspension assembly which is ideally suited for use with helicopters and which may be used with helicopters of varied makes. The assembly of the present invention is not intended as a permanent fixture to the helicopter as it does not require that the helicopter be fitting with any permanent components.

The camera suspension assembly of the present invention is also quickly and easily adjusted to suit the flying characteristics of most helicopters and therefore, is not relegated to use with any one type of helicopter.

The present invention comprises a camera suspension assembly for a helicopter, the latter having a centrally located cargo hook and a cross-strutted landing gear, said assembly comprising an elongated beam swingably connected at its midpoint to the cargo hook and normally being arranged in a level fore and aft extending position, a pair of restraining members detachably connectable to the landing gear struts in fore and aft alignment on opposite sides of the cargo hook and engaging the beam for restraining movement thereof out of its normal position, an elongated aerodynamically-stable camera housing having a camera mounted interiorly at each end thereof and supporting cables extending in parallel relationship between the beam and housing and being spaced apart equidistantly on opposite sides of the centre of gravity of the housing for swingably supporting the latter in parallel relationship with the beam.

BRIEF DESCRIPTION OF THE DRAWINGS

FIGURE 1 is a side view of the invention secured to a helicopter, showing, in solid lines, its position when the helicopter is hovering and, in broken lines, its position when the helicopter is moving forwardly, FIGURE 2 is a frontal end view of the invention and helicopter of FIGURE 1, and FIGURE 3 is an enlarged isometric view of one of the restraining members in position on a landing gear strut, with the beam partially shown.

DESCRIPTION OF THE PREFERRED EMBODIMENT

Referring to the drawings, particularly FIGURES 1 and 2, the numeral 10 designates a helicopter of the type having a single rotor 11 and a cargo hook 12 positioned in vertical alignment with said rotor 11. This cargo hook is a conventional remotely-releasable type and is therefore not shown in detail. The helicopter 10 is provided with landing gear 13 having cross struts or tubes 14 and 14a located both fore and aft of the cargo hook, said cross struts supporting landing skids 15.

The camera suspension assembly accorded the general numeral 16 comprises an elongated stiff beam 17 of I-shaped cross section, the length of which is greater than the distance between the cross struts 14 and 14a. The beam 17 is suspended from the cargo hook 12 by means of a link 19 located at the middle length of the beam link directly above its centre of gravity 18 so that said beam, when permitted to swing freely, will tend to assume a level, fore and aft extending position above the bottom of the skids 15.

The beam is restrained from swinging out of its fore and aft extending position by means of a pair of restraining members 20 and 21 connected to the fore and aft cross struts 14 and 14a respectively. These restraining members are identical and corresponding components of each have been accorded the same numerals.

Referring to FIGURE 3, restraining member 20 is illustrated in detail. Member 20 includes an elongated semi-circular saddle 23 to which are welded a pair of elongated spaced apart and parallel arms 25 and 26. These arms are preferably made of plate steel and each arm is provided with a vertical row of holes 29, the holes in the arm 25 being in registry with the holes in the arm 26. The arms 25 and 26 are spaced apart a distance a little greater than the width of the beam 17 and each is provided with a bolt 31 which may be selectively extended through any pair of transversely registering holes and then secured in position by nut 32.

The assembly 16 also includes an elongated torpedo-shaped camera housing 35 having stabilizing fins 36 at its after end 37. Inside the housing are mounted electrically electrically operated cameras 40 and 41. These cameras may be permanently mounted in any suitable manner with their axes extending in parallelism and transversely to the longitudinal axes of the housing. The housing is also provided with a pair of fore and aft loops 43 and 44 which are aligned longitudinally of the housing and spaced apart equidistantly on opposite sides of its centre of gravity 47. Skids 48 secured to the housing provide stability for the latter when resting upon the ground.

The housing is connected to the beam 17 by means of cables 49 and 50 the latter being of equal length. Cable 49 is connected at one end to loop 43 and at its other end to a link 51 positioned adjacent the forward end of the beam whereas cable 50 is connected at one end to the loop 44 and at its other end to a link 52 at the after end of the beam. These links 51 and 52 are spaced apart a distance equal to the distance between loops 43 and 44 and are located equidistantly from and on opposite sides of link 19.

In the use of the camera suspension assembly, the restraining members 20 and 21 are secured to the struts 14 and 14a, respectively, in fore and aft alignment, by means of split-ring clamps 53. The beam 17 is then positioned between the arms 25 and 26 of both members 20 and 21 at its link 19 engaged with the cargo hook 12. The beam is then angularly adjusted relative to the longitudinal axes of the helicopter to a position which will result in its extending in a level or horizontal condition when the helicopter is flying at a predetermined speed, this speed being that at which it is intended to fly the helicopter when conducting the survey. The beam is then fixed in this position by inserting the bolts 31 through appropriate holes 29 in the arms of both members 20 and 21 so that the bolts lie above and engage the beam to prevent vertical angular movement thereof. The housing 35 is then placed adjacent the skids of the helicopter and connected to the beam in the manner heretofore described by the cables 49 and 50. An electrical harness 54 is then run from the helicopter to the cameras, the harness being provided with a straight pull cannon plug release 55.

In flight, at the aforesaid predetermined speed, the fins 36 will lend the housing lateral stability and the parallel disposition of the cables 49 and 50 will maintain the fore and aft parallel relationship of the housing and beam (as illustrated in broken lines in FIGURE 1) despite the effect of drag.

It will be appreciated that due to the angular disposition of the cables from the vertical, during flight, vertical vibration of the aircraft will have little effect on the cameras and the horizontal vibrations will be completely dampened as the housing is freely suspended below the beam.

The suspension assembly, it will be realized, is only a temporary adjunct to the aircraft, yet accuracy of camera alignment is certain as the housing may be specifically and permanenty designed for this purpose so that the only adjustment required when fitting the assembly to the aircraft involves the adjustment of the beam.

It will be appreciated that once the survey work is completed the assembly may be easily dismounted and the aircraft then used for other purposes. The present assembly may also very easily be jettisoned if the aircraft should ever get into difficulties, as all that is required is to operate the cargo hook release to permit the whole assembly to drop clear of the helicopter.

What is claimed is:
1. Camera suspension assembly for a helicopter, the latter having a centrally located cargo hook and a cross-strutted landing gear, said assembly comprising an elongated beam swingably connected at its midpoint to the cargo hook and normally being arranged in a level, fore and aft extending position, a pair of restraining members detachably connectable to the landing gear struts in fore and aft alignment and on opposite side of the cargo hook and engaging the beam for restraining movement thereof out of its normal position, an elongated areodynamically stable camera housing having a camera mounted interiorly at each end thereof and supporting cables extending in parallel relationship between the beam and housing and being spaced apart equidistantly on opposite sides of the centre of gravity of the housing for swingably supporting the latter in parallel relationship with the beam.

2. Camera suspension assembly as claimed in claim 1 in which the camera housing is torpedo-shaped having stabilizing fins at the aft end thereof.

3. Camera suspension assembly as claimed in claim 1 in which the restraining members are vertically adjustable so as to permit vertical angular adjustment of the beam relative to the helicopter.

4. Camera suspension assembly as claimed in claim 1 in which each restraining member comprises a U-shaped bracket having a base and a pair of spaced-apart, parallel arms for slidably embracing the beam, each of said arms having a vertically extending row of holes formed therein, a bolt selectively extensible through any pair of transversely aligned holes in the arms of each bracket, and clamping means for releasably clamping the base to a cross strut.

References Cited

UNITED STATES PATENTS

| 1,626,787 | 5/1927 | Corlett | 95—12.5 |
| 2,512,486 | 6/1950 | Craig | 95—12.5 |
| 2,906,181 | 9/1959 | Hofstra | 95—12.5 |
| 3,338,147 | 8/1967 | Goddard | 95—12.5 |

NORTON ANSHER, Primary Examiner

ALAN MATHEWS, Assistant Examiner

U.S. Cl. X.R.

95—86